US008268432B2

(12) United States Patent
Malcolm

(10) Patent No.: US 8,268,432 B2

(45) Date of Patent: Sep. 18, 2012

(54) CO-MOLDED ELEMENTS IN REINFORCED RESIN COMPOSITES

(76) Inventor: Roger J. Malcolm, San Clemente, CA (US)

( * ) Notice: Subject to any disclaimer, the term of this patent is extended or adjusted under 35 U.S.C. 154(b) by 569 days.

(21) Appl. No.: 12/400,734

(22) Filed: Mar. 9, 2009

(65) Prior Publication Data

US 2009/0169831 A1 Jul. 2, 2009

Related U.S. Application Data

(60) Continuation-in-part of application No. 11/742,368, filed on Apr. 30, 2007, now abandoned, which is a division of application No. 10/969,506, filed on Oct. 20, 2004, now Pat. No. 7,210,180.

(60) Provisional application No. 60/513,137, filed on Oct. 20, 2003, provisional application No. 60/550,991, filed on Mar. 4, 2004.

(51) Int. Cl.
*B32B 23/02* (2006.01)
*B32B 27/38* (2006.01)

(52) U.S. Cl. ................................ 428/60; 428/53; 428/58

(58) Field of Classification Search .................... 428/60, 428/58, 53

See application file for complete search history.

(56) References Cited

U.S. PATENT DOCUMENTS

2004/0171436 A1* 9/2004 Sullivan ........................ 473/371

OTHER PUBLICATIONS

Reinhart, Engineered Materials Handbook (Composites), Copyright 1987, pp. 24, 27-35, 138-142, 289-294, 654-663, vol. 1, ASM International, United States.

* cited by examiner

*Primary Examiner* — Brent O Hern

(74) *Attorney, Agent, or Firm* — Charmasson, Buchaca & Leach. LLP

(57) ABSTRACT

A composite structure such as a carbon-fiber surgical table width extender includes a fiber-resin composite body and outer surface protective elements. The protective elements are adhered to the body during curing of the body's thermosetting binding matrix at a given temperature and pressure. The protective elements can include stainless steel elements and thermosetting elements which can be deformably thermoplastic and non-liquid, and simultaneously thermoset at this same temperature and pressure.

12 Claims, 6 Drawing Sheets

CO-MOLDED ELEMENTS IN REINFORCED RESIN COMPOSITES

PRIOR APPLICATION

This application is a continuation-in-part of U.S. patent application Ser. No. 11/742,368 filed Apr. 30, 2007 which was a divisional of U.S. patent application Ser. No. 10/969, 506 filed Oct. 20, 2004 now U.S. Pat. No. 7,210,180 issued May 1, 2007, which claims the benefit of U.S. Provisional Patent Application Ser. No. 60/513,137 filed Oct. 20, 2003, and 60/550,991 filed Mar. 4, 2004.

FIELD OF THE INVENTION

This invention relates to manufacturing reinforced resin composites for use in medical devices and more particularly to surgical tables and their attachments.

BACKGROUND OF THE INVENTION

Specialized tables have long been used to support and immobilize individuals so that doctors can readily access body parts of interest during surgery or other treatments. So-called surgical tables come with a number of mechanical enhancements to further this purpose. Many such tables are articulatable to support patients in a supine, sitting or other orientations. Many such tables come equipped with side rails mounted along the lateral edges of the table so that various devices and attachments can be secured to the table, including devices such as arm and head immobilizers, and equipment platforms. The rails are mounted to the edge of the table on a number of spaced-apart stand-offs which form a gap between the rail and the table edge of about 1 to 3 centimeters.

Because of their ruggedness and adaptability, and the number of features provided by these tables, the tables are often expensive. It is difficult for hospitals and other health care institutions to purchase a number of tables for different-sized individuals. Since many individual's weight exceeds three or four hundred pounds, most standard-sized surgical tables have an upper surface which is too narrow to adequately support such individuals.

This has prompted the development of detachable platforms for increasing the upper surface of the table. Existing platforms typically mount directly to the rails without contacting any other portion of the table. Therefore, the load to be carried by the platform must be exclusively borne by the rail/stand-off assembly. Many platforms also leave a gap between the table surface and the platform which can be uncomfortable and provide reduced support. Further, these platforms take up valuable rail space which may otherwise have been used for other attachments.

Medical devices have long been manufactured from reinforced resin composites because they have a high stiffness-to-weight ratio, are strong, light-weight, and can be made to reduce interference with x-rays or other medical imaging modalities. Fiber-resin composite manufacturing techniques are discussed in *Engineered Materials Handbook Volume* 1 *Composites*, published by ASM International (1987). Devices made from fiber-resin composites can be sensitive to localized excessive mechanical forces which can result in fraying, cracking or other damage which can render the device inoperative.

There is, therefore, a need for a device which increases the usable upper surface of a surgical table without detracting from its utility and which can withstand the rigorous medical/surgical treatment/imaging environment while maintaining low manufacturing costs.

SUMMARY OF THE INVENTION

The principal and secondary objects of this invention are to provide a device for increasing the usable upper surface area of a surgical table.

These and other objects are achieved by a table width extender having an angled tang structure for engaging the gap formed between a standard table and its stand-off-mounted side rail. The tang structure contacts portions of the rail and portions of the table to enhance rather than decrease the load-carrying capability of the table side rail/stand-off assembly. The extender further provides its own stand-off-mounted rail and a quick release clamp for securing the extender to the table in any table orientation. The tang structure is formed to allow a single extender to be used on either side of a surgical table where the stand-offs are not evenly spaced apart. By engaging the gap between the table and its rail, the spacing between the upper surface of the table and the upper surface of the extender is reduced. The extender body is formed from a lightweight, strong carbon fiber composite material. Further enhancements protect exposed corners of the extender and protect potential high stress surfaces. An angularly orientable attachment is provided for use when two width extenders are used simultaneously on opposite sides of the table. In a lowered, horizontal orientation the attachment acts as a table length extender. In a raised, upright orientation the attachment acts as a foot stop. The attachment is formed from a lightweight, strong carbon fiber composite material. Further enhancements protect exposed edges and corners.

In some embodiments there is provided a composite structure which comprises: a body comprising a first material; and, and a protector comprising a second material, different from said first material; wherein said first material comprises a plurality of elongate fibers bound together by an uncured thermosetting binding matrix which can cure at a given temperature and pressure; wherein said second material is deformably thermoplastic and non-liquid at said temperature and pressure; and, wherein said protector is adhered to said body by said binding matrix.

In some embodiments said binding matrix has a given adhesiveness and wherein said adhesiveness is sufficient to mount said protector to said body. In some embodiments said binding matrix comprises epoxy. In some embodiments said protector provides a first outer surface of said structure. In some embodiments said body provides an exposed outer surface of said structure, said exposed outer surface of said body is commensurate with said first outer surface of said protector. In some embodiments said fibers comprise carbon. In some embodiments said protector forms a protective bumper on a corner of said structure. In some embodiments said protector forms a protective strip on a surface portion of said structure. In some embodiments said second material is elastomeric. In some embodiments said second material is selected from the group consisting of rubber and plastic. In some embodiments said second material comprises stainless steel. In some embodiments said first outer surface of said protector is formed to have a divot. In some embodiments said first outer surface of said protector is formed to have a plurality of spaced apart nibs extending therefrom. In some embodiments an inner surface of said protector engages said body using a tongue-in-groove engagement.

In some embodiments there is provided a method for adhering a protective structure to a fiber composite structure, said method comprises: forming an uncured body from a first composite material comprising a plurality of elongate fibers and an uncured thermosetting binding matrix; forming a protector made from a thermoplastic elastomeric second material different from said first composite material; engaging a surface of said protector with a surface of said uncured body; simultaneously pressurizing and thermally curing said uncured body at a temperature and pressure wherein said second material becomes a deformably thermoplastic non-liquid to form a cured fiber composite structure adhered to said protector. In some embodiments said engaging comprises orienting said body and said protector so that an outer surface of said protector and an exposed outer surface of said body are substantially commensurate. In some embodiments the method further comprises: forming a groove in said protector; forming a tongue in said body; and, oversizing said groove to accommodate a flow of said matrix material during said curing.

DESCRIPTION OF THE PREFERRED EMBODIMENT OF THE INVENTION

Figure 1:
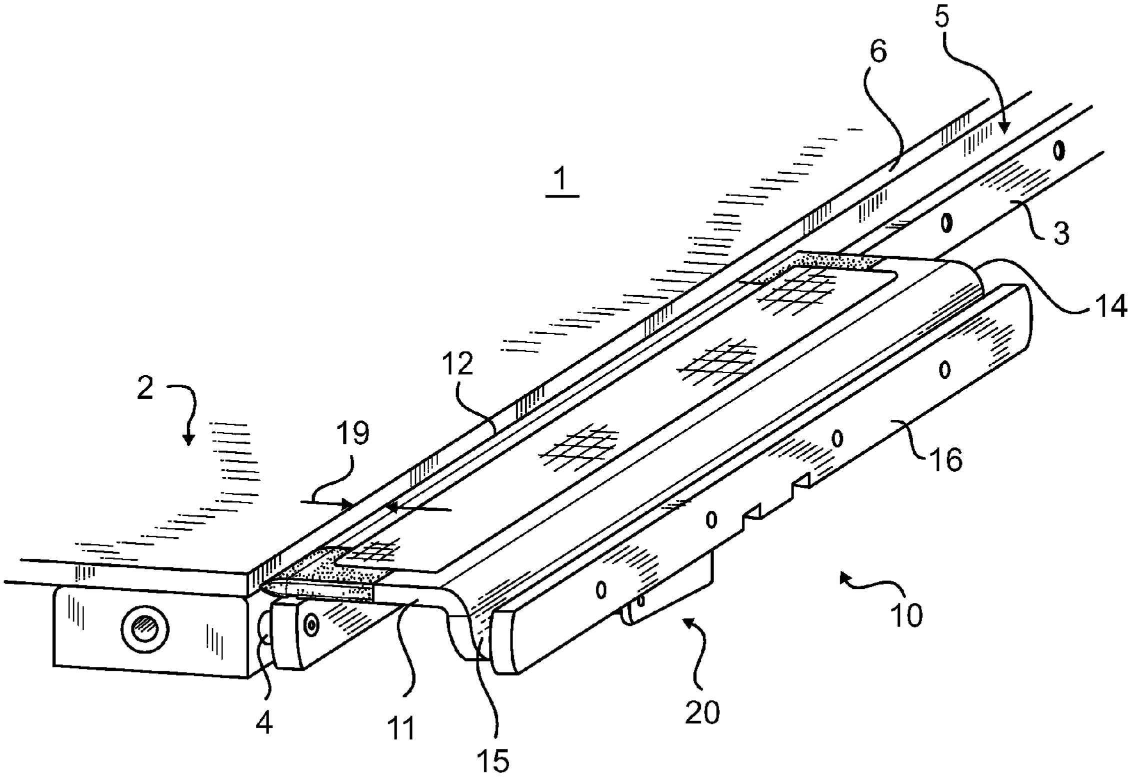
FIG. 1 is a diagrammatic partial perspective view of a surgical table extender according to the invention as mounted upon a surgical table.

Referring now to the drawing, there is shown a surgical table 1 having an upper surface 2 and a laterally mounted table side rail 3 mounted upon a number of stand-offs 4 thereby forming a gap 5 between the table edge 6 and the table side rail 3.

The table width extender 10 is formed by a substantially planar oblong plate 11 having a first edge 12 from which downwardly extends the tang structure 13. Along the opposite lateral edge 14 is a downwardly projecting flange 15 for supporting an extension side rail 16 mounted upon a number of extension stand-offs 17 to create an extension gap 18 between the extension side rail 16 and the extension flange 15. Mounted to the under surface 61 of the plate is a clamp 20 oriented to bear against the table side rail 3 thereby releasably securing the width extension to the table, and to allow the extension to remain secured during use of the table in non-horizontal orientations.

A table width extender 10 is secured to the table by means of an angled tang structure 13 which engages the gap and is cantileverly supported thereby by contacting the upper surface 22 of the table side rail 3 and the lower vertical surface 44 of the table side edge. This allows the top surface of the extender to be substantially within the same plane of the table, and allows the spacing 19 between the upper surface of the table and the upper surface of the extender to be reduced. Through this dual contact mechanism, downward loads applied to the extension create a greater tension force component in the table stand-offs, thereby enhancing the load capability of the table side rail/stand-off assembly.

The plate, tang and flange structures are preferably made from an integrated piece of durable, strong and lightweight material such as a carbon fiber resin composite. The formation of such composites are well-known to those skilled in the art.

Because composites can be susceptible to damage from mechanical shock such as dropping on the floor, the exposed corners 24, 25 of the plate are formed to have the capability of mounting resilient bumpers 26, 27 thereon.

Figure 3:
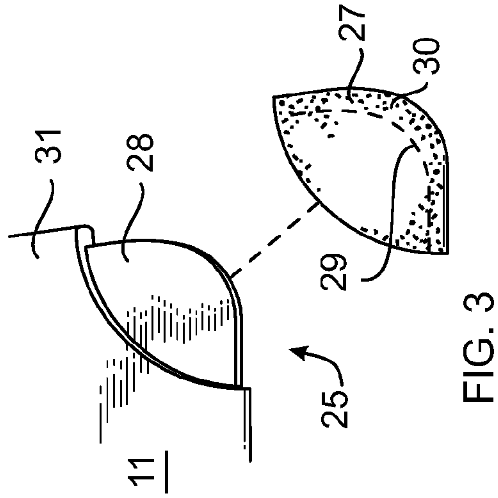
FIG. 3 is a diagrammatic close-up exploded perspective view of the corner bumper feature of the invention.

Referring now to FIG. 3, the corner 25 of the plate 11 can be formed to have a recessed tongue 28 structure which engages a corresponding groove structure 29 in the bumper. This allows the outer surface 30 of the bumper to be commensurate with the exposed outer surface 31 of the plate.

The bumper is preferably made from a resilient, durable elastomeric and thermoplastic material such as plastic or a resilient, elastomeric thermosetting material such as rubber. The bumper can be fastened to the plate using a separate adhesive or can be adhered during formation of the carbon fiber plate using the adhesiveness of the carbon fiber binding matrix material such as epoxy described in greater detail below.

The carbon fiber binding matrix material such as epoxy is selected to be thermosetting such that the resin cures more rapidly when subjected to a selected elevated temperature and pressure. The material such as epoxy is also selected so that when combined with a fiber material such as carbon fiber, it can be cured and formed in a heated mold, thus applying the above selected elevated temperature while simultaneously applying pressure through a preformed mold.

The bumper material is selected to remain thermoplastic and non-liquid at the above elevated temperature. In this way, the uncured fiber-resin composite structure and the bumper of the table width extender can be placed simultaneously in the same curing mold. The temperature can then be raised above the selected elevated resin curing temperature but below the liquid transition temperature also known as the softening or melting point of the bumper material. This results in a cured fiber-resin composite width extender having the elastomeric bumpers adhered theron in a single processing step, thus saving manufacturing costs.

It should be noted that the bumper surfaces intended to interface with the plate can be textured to create a tooth for stronger binding contact between the bumper and plate. Such texturing can include but is not limited to waffling, knurling, pits, and bumps. Care should also be taken in dimensioning the bumper to allow for an amount of binding matrix material bleeding into the interface zone between the bumper and plate to engage the texturing. Thus, in a tongue-in-groove interface, the groove of the bumper can be specifically oversized to accommodate the calculated influx of epoxy. Surfaces of the bumper exposed to contacting the mold can have registration prominences such as spicules, or nibs for intimately engaging corresponding features in the mold. In this way the bumper is better held in place during the curing heating and pressurizing.

If a thermosetting material such as rubber is used for the bumper material, the bumper material can be injected into the mold containing the uncured fiber-resin composite. The mold is then raised to the elevated temperature which is selected to both cure the resin matrix material and to thermoset the bumper material. The simultaneous pressure of the mold forms the materials into the finished width extender simultaneously with the bumper adhered.

Other types of resin matrix materials which can be simultaneously cured while being adhered to a thermoplastic-type material. Candidate resins include epoxies, phenolic, and polyimide, among others. Candidate elastomeric bumper materials include rubber, polyurethane and silicone. Of course, care must be taken to select these materials based on their thermal transition properties.

The following is an example manufacturing process which results in a table width extender made from a carbon fiber/epoxy matrix composite having polyurethane plastic bumpers co-molded and adhered thereto. A thermoset-type epoxy resin is selected which typically cures within about 15 to about 20 minutes when heated to a temperature of between about 175° F. and 350° F. The uncured epoxy is combined with carbon fibers using techniques well known in the art. In this example a thermosetting preimpregnated resin tape or "prepreg" is used such as unidirectional fiber tape available from American Cyanamid Co. of Wayne, N.J. Layers of the tape are formed into an uncured plate body corresponding in shape to the width extender. A bumper made from polyurethane having a melting point of about 530° F. is premolded using techniques known in the art. The bumper is fitted into place on the uncured body. Both the uncured plate body and fitted bumper are placed in a closed cavity female-type mold. The mold is placed in a 150-ton molding press heated to about 275° F. for about 30 minutes. The mold is then cooled to about 70° F. at a rate of about 10° F./min. The cured body with adhered bumper is removed from the mold and finished using techniques known in the art.

Figure 2:
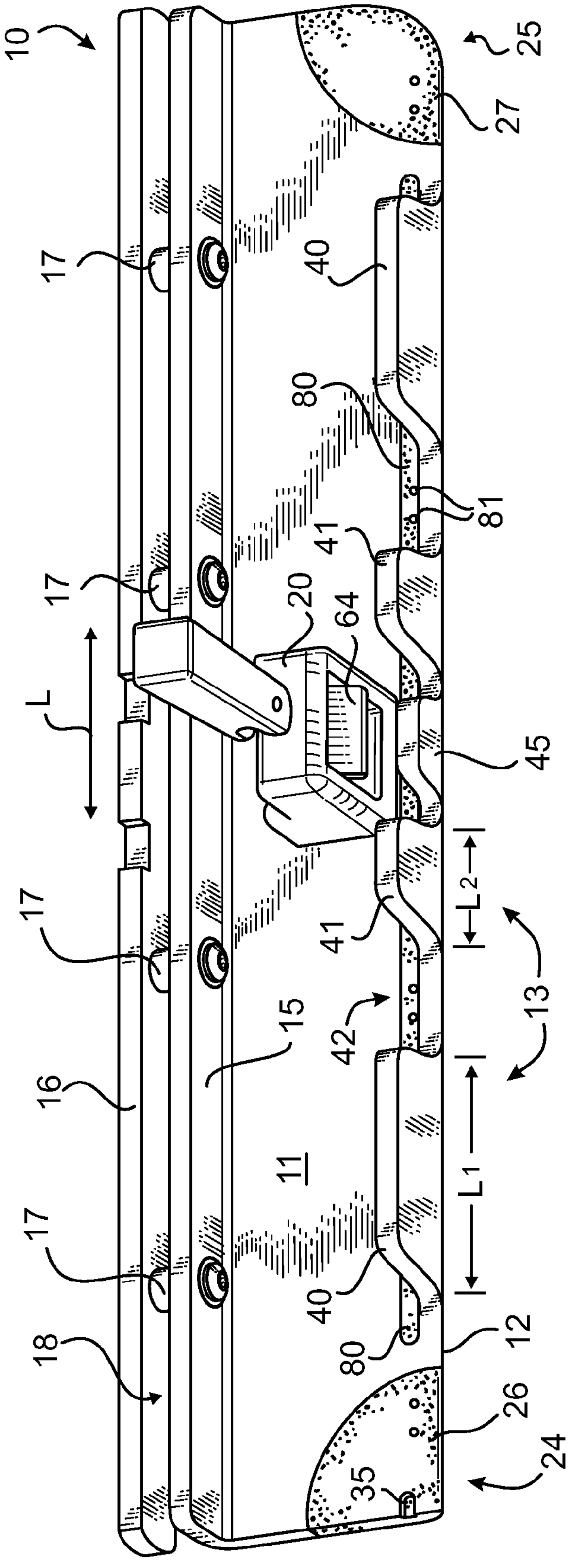
FIG. 2 is a diagrammatic perspective view of the under side of a table extender of FIG. 1.

As shown in FIG. 2, a divot 35 is formed into the under surface of the bumper 26 intended to contact the upper surface of the table side rail. Some surgical table side rails have retractable buttons extending above the flat upper surface of the table side rails. The divot is therefore, sized and positioned to allow the extender to snugly fit to the table side rail over the button. Alternately, the corner 25 of the plate closest to the button can be rounded to avoid contact with the button.

The tang structure 13 of the table extender is formed to allow it to penetrate the gap 5 without interference from the table stand-offs 4. Therefore, the tang structure is formed to have a number of prominences 40, 41. Each pair of adjacent prominences is separated by a notch 42. Therefore, the notch is large enough to fit over a table stand-off. The length of the prominences and the notches in the longitudinal direction L is selected to allow the extension to be placed on tables having non-uniformly spaced-apart table side rail stand-offs and to further allow the extension to be placed universally on either side of the surgical table while still providing adequate surface area for contact at the distal end 43 of the tang with the vertical side surface 44 of the table. Therefore, the most distally located prominences 40 have a length $L_1$ which is longer than the length $L_2$ of the more proximally located prominences 41. This will also result in a symmetrical arrangement of the tang structure moving from a medial position nearest the clamp 20 outward distally to either longitudinal end of the extender.

Each prominence has a substantially planar shape, and all prominences generally lie within the same plane. This plane forms an angle A with any plane P parallel to the plane of the plate 11. For many commonly available surgical tables, the preferred angle has been found to be between about 90 and 110 degrees.

The depth in the vertical direction, the thickness and angle of each prominence is generally a function of the table side rail and stand-off dimensions. However, to adequately increase the tension component in the table stand-offs, the distal end 43 of the tang should extend below the undersurface 21 of the table side rail when the extension is engaged. The exception is where the depth of the center prominence 45 is reduced to make room for the tooth 64 of the clamp structure 20 in the engaged orientation.

Figure 4:
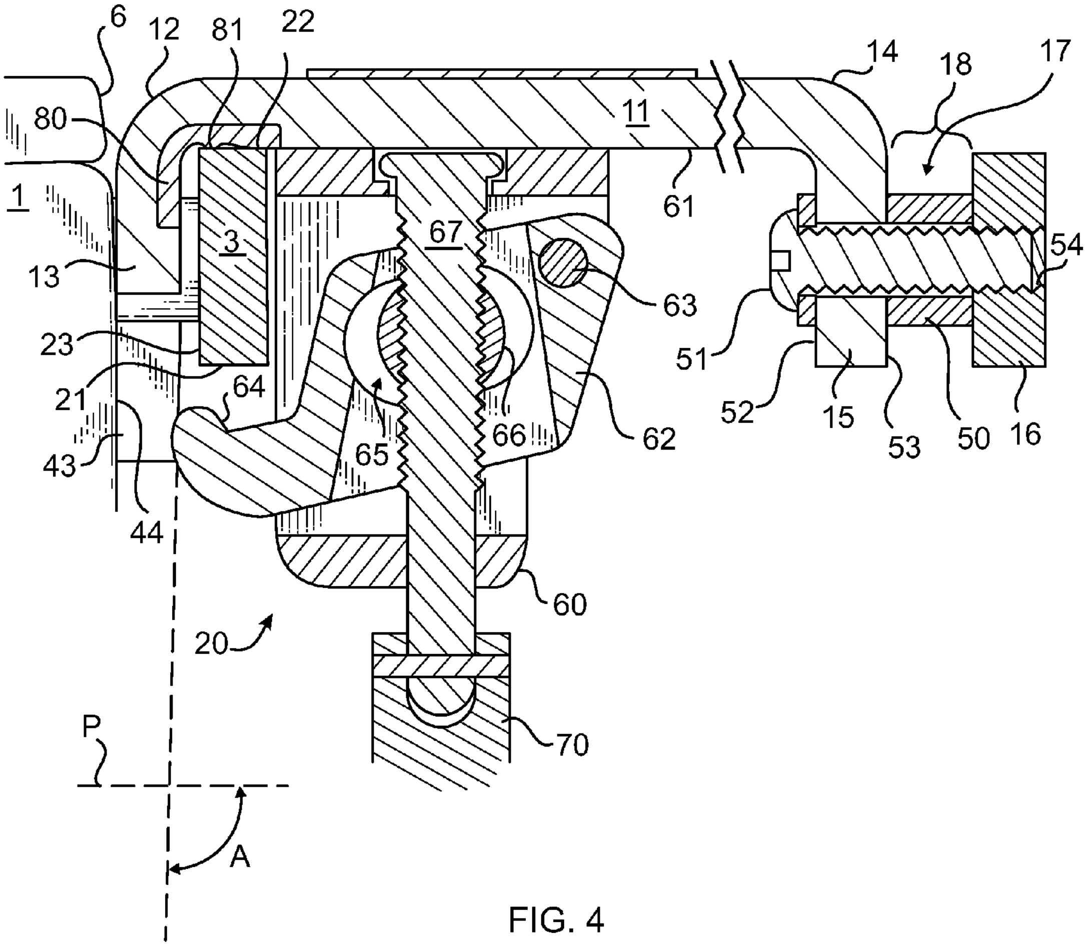
FIG. 4 is a diagrammatic side cross-sectional view of the table extender including view of the clamp mechanism and extender side rail stand-off assembly.

Referring now to FIG. 4, the extender side rail 16 is attached to the extension flange 15 by a number of spaced-apart stand-offs 17. Each stand-off 17 is formed to have a substantially cylindrical stand-off bushing 50 acting as a separator between the rail and the flange. Fastening occurs by use of a screw fastener 51 penetrating from the proximal side 52 of the flange through to the distal side 53 on through the bushing and into a threaded receptor hole 54 in the extension side rail.

Figure 5:
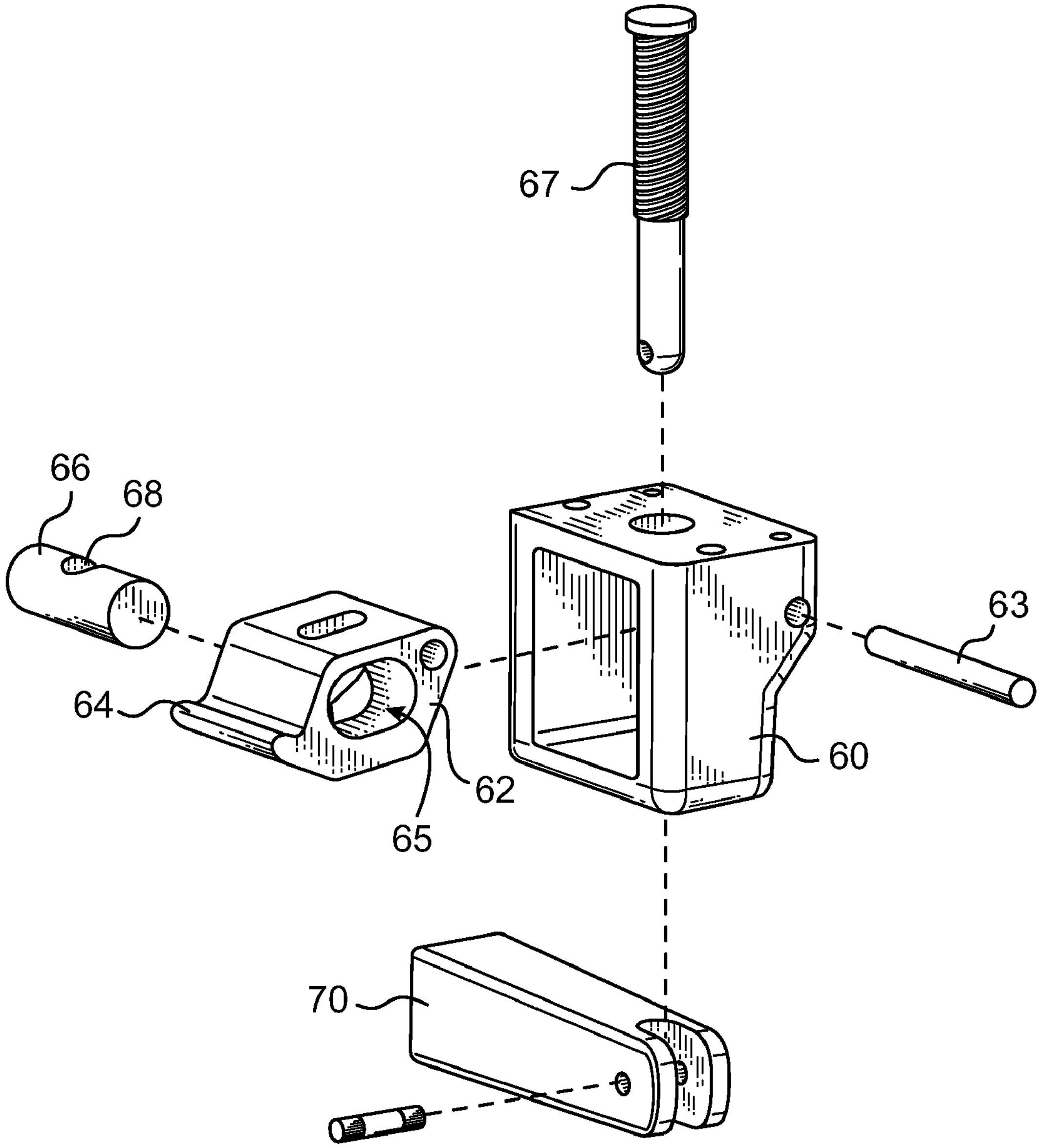
FIG. 5 is a diagrammatic exploded perspective view of the major components of the clamp according to the invention.

Referring now to FIGS. 4 and 5, the preferred clamp structure 20 will now be described. The clamp 20 is formed by a housing 60 which mounts to the underside 61 of the extension plate 11 in a position which allows a jaw 62 to engage the table side rail 3. The jaw is pivotably mounted to the housing 60 at a pivot pin 63. The jaw comprises a jaw body and a tooth 64 for bearing against the table side rail undersurface 21 and the far side vertical surface 23 of the rail facing the table when in the engaged orientation. An oblong, oval bearing slot 65 is formed into the jaw body, the axis of the slot is formed parallel with the axis of the pin 63. A cylindrical rod 66 rotatively and slidingly engages the slot. A threaded drive shaft 67 engages a threaded hole 68 radially penetrating diametrically through the rod. A handle 70 allows rotation of the threaded drive shaft thereby causing the rod to process vertically along the drive shaft. As it does so, it slidingly and rotatingly moves within the oval slot causing rotational motion of the jaw around the axis of the pin.

Referring now to FIG. 4, a protective strip 80 made from a durable hard material such as stainless steel or a durable, resilient elastomeric material such as plastic or rubber is preferably formed in the undersurface of the plate proximal to the tang structure where contact with the table side rail occurs to accommodate the greater stress subjected to this surface. Similarly to the bumper, the protective strip can be adhered to the plate during curing of the plates carbon fiber binding matrix material. For a protective strip made from elastomeric material, a number of longitudinally spaced apart nibs 81 are formed to extend from the undersurface of the protective strip to contact the table side rail. The nibs help prevent, over time, the unwanted adherence between the strip and the table side rail. The nibs are also used as registration prominences when the strips are co-molded with the plates.

Figure 6:
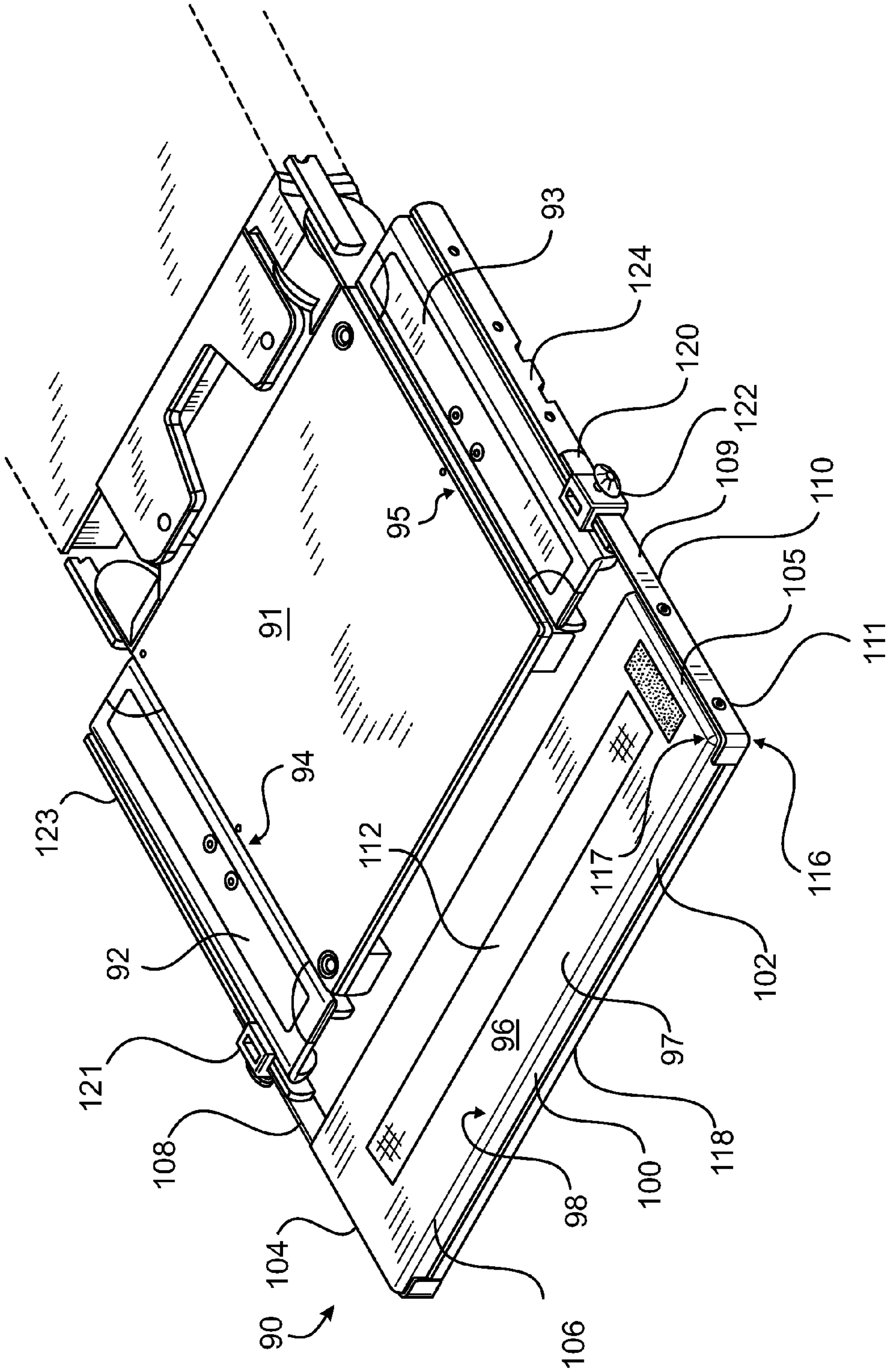
FIG. 6 is a diagrammatic perspective view of the top side end portion of a surgical table having two mounted width extenders and an angularly orientable attachment acting as a table length extender.
Figure 7:
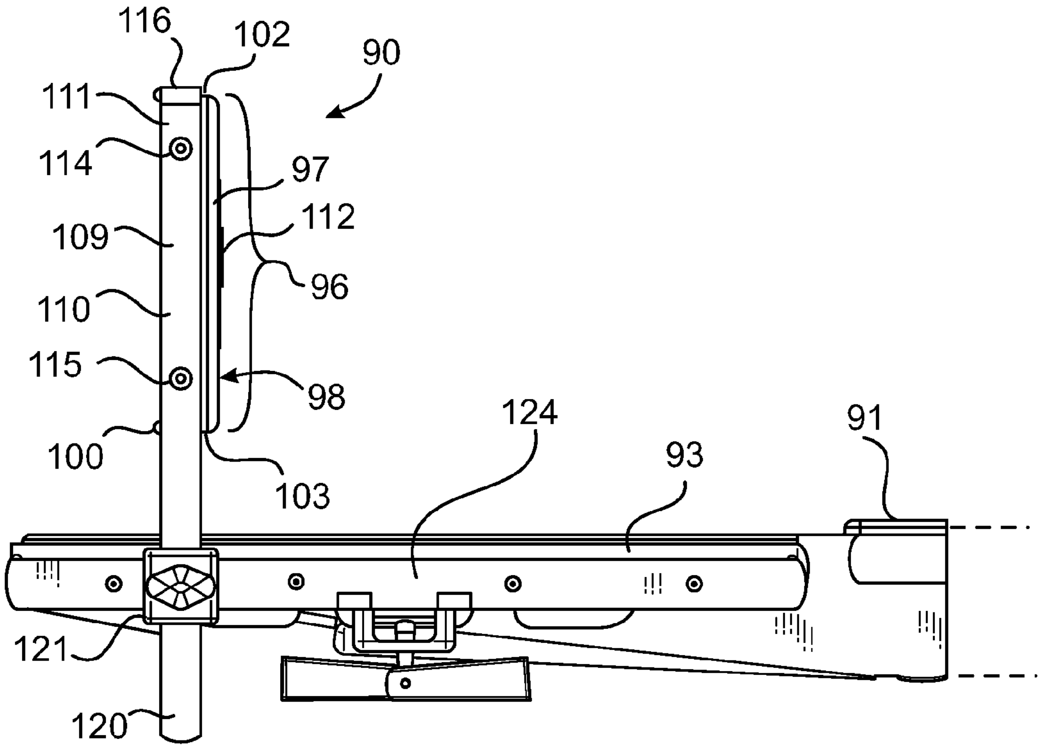
FIG. 7 is a diagrammatic side elevational view of the end portion of a surgical table having two mounted width extenders and an angularly orientable attachment acting as a foot rest.
Figure 8:
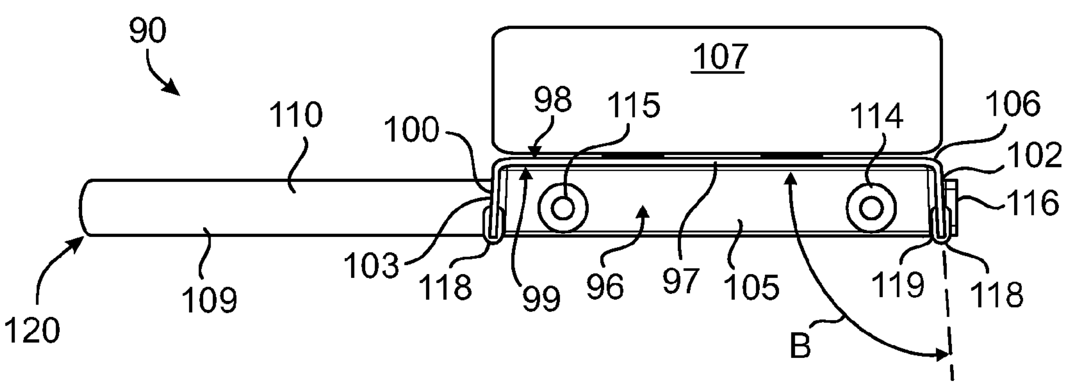
FIG. 8 is a diagrammatic side cross-sectional view of the angularly orientable attachment of FIG. 6 and including a cushion.

Referring now to FIGS. 6-8, there is shown an angularly orientable attachment structure 90 which is attachable to a surgical table 91 having a pair of width extenders 92,93 secured thereto on opposite sides 94,95 of the table in a manner as described above. In FIG. 6, the attachment is shown attached in a lowered, horizontal orientation so that the attachment acts as a table length extender. In FIG. 7, the attachment is shown in a raised, upright orientation where the attachment acts as a foot stop. The attachment is oriented to be substantially 90 degrees from the orientation in FIG. 6.

The attachment 90 has a tray 96 portion formed by an elongated, substantially quadrangular and planar base 97 having front 98 and back 99 surfaces and a stiffening brace 100.

The brace is formed by a sidewall structure 101 formed by top 102, bottom 103, and opposite side substantially planar portions 104,105 which extend backwardly from the peripheral edge 106 of the base 97. The angle B formed between the base and the top and bottom sidewall portions is preferably off 90 degrees or non-orthogonal to provide a reduced radiological footprint. The most preferred angle is between about 91 and about 115 degrees. The base and brace are preferably made from an integrated piece of durable, strong, lightweight, and rigid material such as carbon fiber composite material. The formation of such composites are well-known to those skilled in the art. The front surface of the tray is adapted to releasably mount a cushion 107 as shown in FIG. 8 using a patch 112 of hook and loop fabric fastener such as VELCRO brand fastener.

The attachment has a pair of elongated support arms 108, 109 which allow the attachment 90 to releasably secure to the in-place width extenders 92,93. Each support arm is formed from an oblong bar 110 of strong, rigid and durable material such as steel. A first proximal end portion 111 of the bar is bonded to the tray 96 by means of a pair of fasteners 114,115 engaging one of the tray sidewall side portions 104,105. A hook 116 is formed onto the end of the bar 110 to protect the corner 117 formed by top and side portions of the sidewall structure. Additionally, a generally U-shaped cross-section protective, molding 118 made from durable, rigid material such as urethane plastic further protects the backward edge 119 of the sidewall.

An opposite distal end portion 120 of the bar 110 is sized to engage a slotted engagement clamp 121,122 releasably attached to each of the extension side rails 123,124. Such clamps are commercially available under the brand name AMSCO by Steris Corporation of Mentor, Ohio. These clamps allow engagement from mutually orthogonal directions corresponding to the two attachment orientations described above.

While the preferred embodiments of the invention have been described, modifications can be made and other embodiments may be devised without departing from the spirit of the invention and the scope of the appended claims.

What is claimed is:

1. A composite structure comprises:

a body comprising a first material; and, and a protector comprising a second material, different from said first material;

wherein said first material comprises a plurality of elongate fibers bound together by a thermosetting binding matrix which can cure at a given temperature and pressure;

wherein said second material is deformably thermoplastic and non-liquid at said temperature and pressure; and, wherein said protector is adhered to said body by said binding matrix;

wherein said protector provides a first outer surface of said structure; and, wherein said protector comprises stainless steel.

2. The structure of claim 1, wherein said binding matrix has a given adhesiveness and wherein said adhesiveness is sufficient to mount said protector to said body.

3. The structure of claim 1, wherein said binding matrix comprises epoxy.

4. The structure of claim 1, wherein said body provides an exposed outer surface of said structure, said exposed outer surface of said body is commensurate with said first outer surface of said protector.

5. The structure of claim 1, wherein said fibers comprise carbon.

6. The structure of claim 1, wherein said protector forms a protective bumper on a corner of said structure.

7. The structure of claim 1, wherein said protector forms a protective strip on a surface portion of said structure.

8. The structure of claim 1, wherein said second material is elastomeric.

9. The structure of claim 1, wherein said second material is selected from the group consisting of rubber and plastic.

10. The structure of claim 1, wherein said first outer surface of said protector is formed to have a divot.

11. The structure of claim 1, wherein said first outer surface of said protector is formed to have a plurality of spaced apart nibs extending therefrom.

12. The structure of claim 1, wherein an inner surface of said protector engages said body using a tongue-in-groove engagement.

* * * * *